US008688045B2

(12) United States Patent
Lin et al.

(10) Patent No.: US 8,688,045 B2
(45) Date of Patent: Apr. 1, 2014

(54) FM TRANSMITTER AND NON-FM RECEIVER INTEGRATED ON SINGLE CHIP

(75) Inventors: I-Hsiang Lin, Mountain View, CA (US); Tzu-wang Pan, Saratoga, CA (US); Yi Zeng, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1122 days.

(21) Appl. No.: 12/274,167

(22) Filed: Nov. 19, 2008

(65) Prior Publication Data

US 2010/0124891 A1 May 20, 2010

(51) Int. Cl.
*H04B 1/00* (2006.01)

(52) U.S. Cl.
USPC ............. 455/42; 455/118; 455/93; 455/323; 455/113; 381/7; 381/98; 381/3; 330/294; 332/127

(58) Field of Classification Search
USPC ............ 455/118, 93, 232.1, 323, 113; 381/7, 381/98, 3; 330/294; 332/127
See application file for complete search history.

(56) References Cited

U.S. PATENT DOCUMENTS

| | | | | |
|---|---|---|---|---|
| 4,524,332 | A * | 6/1985 | Gay | 330/294 |
| 6,515,553 | B1 * | 2/2003 | Filiol et al. | 332/127 |
| 7,741,928 | B1 * | 6/2010 | Cousinard et al. | 332/127 |
| 7,986,926 | B2 * | 7/2011 | Rafi et al. | 455/118 |
| 2003/0092416 | A1 * | 5/2003 | Tanaka et al. | 455/323 |
| 2003/0118126 | A1 | 6/2003 | Moon et al. | |
| 2006/0128334 | A1 * | 6/2006 | Ikuta et al. | 455/232.1 |
| 2006/0246944 | A1 | 11/2006 | Srinivas | |
| 2007/0021076 | A1 * | 1/2007 | Tanaka et al. | 455/118 |
| 2007/0237333 | A1 * | 10/2007 | Sagara | 381/7 |
| 2008/0090543 | A1 | 4/2008 | Huang | |
| 2008/0285761 | A1 * | 11/2008 | Mano et al. | 381/3 |
| 2011/0116655 | A1 * | 5/2011 | Chen | 381/98 |

FOREIGN PATENT DOCUMENTS

CN 1725662 A 1/2006
(Continued)

OTHER PUBLICATIONS

International Search Report and Written Opinion—PCT/US2009/065213, International Search Authority—European Patent Office—Oct. 12, 2010.

(Continued)

*Primary Examiner* — April G Gonzales
(74) *Attorney, Agent, or Firm* — Ramin Mobarhan (57) ABSTRACT

Exemplary embodiments include a frequency modulation (FM) transmitter and a non-FM receiver, which may be implemented on the same IC chip. The FM transmitter may include a digital FM modulator, a lowpass filter, an amplifier, and an LC tank circuit. The digital FM modulator may receive a digital input signal, perform FM modulation with the digital input signal, and provide a digital FM signal. The lowpass filter may filter the digital FM signal and provide a filtered FM signal. The amplifier may amplify the filtered FM signal and provide an output FM signal. The LC tank circuit may filter the output FM signal. The digital FM modulator may perform FM modulation by changing a variable divider ratio of a multi-modulus divider within a PLL. A delta-sigma modulator may receive the digital input signal and generate a modulator output signal used to obtain the variable divider ratio.

25 Claims, 6 Drawing Sheets

(56) References Cited

FOREIGN PATENT DOCUMENTS

| | | | |
|---|---|---|---|
| CN | 1881821 | A | 12/2006 |
| EP | 1220460 | A2 | 7/2002 |
| EP | 1727291 | A2 | 11/2006 |
| JP | 2008509575 | A | 3/2008 |
| JP | 2008099241 | A | 4/2008 |
| JP | 2008199529 | A | 8/2008 |
| KR | 20030055003 | A | 7/2003 |
| WO | WO2008039380 | A2 | 4/2008 |

OTHER PUBLICATIONS

Peng-Un Su et al.: "A Dual-Band Enhanced Harmonic Ejection Filter for Modulators in GSM and DCS Transmitters", Solid-State Circuits Conference, 2003. ESSCIRC '03. Proceedings of the 29th European Digital Object Identifier: 10.1109/ESSCIRC.2003.1257222; Publication Year: 2003, pp. 663-666.

Hao W et al, "Analysis and design of anti-aliasing filter for the electric network harmonic detection," Electrical Measurement & Instrumentation, No. 3, 2008, Mar. 2008, pp. 62-64.

* cited by examiner

FM TRANSMITTER AND NON-FM RECEIVER INTEGRATED ON SINGLE CHIP

BACKGROUND

I. Field

The present disclosure relates generally to electronics, and more specifically to a frequency modulation (FM) transmitter for a wireless device.

II. Background

A wireless device may include multiple transmitters and multiple receivers that can support communication for multiple wireless communication systems. A transmitter may generate an output radio frequency (RF) signal that is modulated with data sent by the wireless device and may transmit the output RF signal via a wireless channel. A receiver may receive an RF signal from a base station and may process the received RF signal to obtain data sent by the base station. The transmitter and receiver may implement a radio technology used by the system.

The wireless device may also include an FM transmitter. The FM transmitter may convert an audio output into an output FM signal and may transmit the output FM signal to a car radio or some other appliance. The FM transmitter may allow the wireless device to provide the audio output to another appliance, which may be preferable under certain scenarios. It is desirable to efficiently implement the FM transmitter on the wireless device.

DETAILED DESCRIPTION

The word "exemplary" is used herein to mean "serving as an example, instance, or illustration." Any design described herein as "exemplary" is not necessarily to be construed as preferred or advantageous over other designs.

Figure 1:
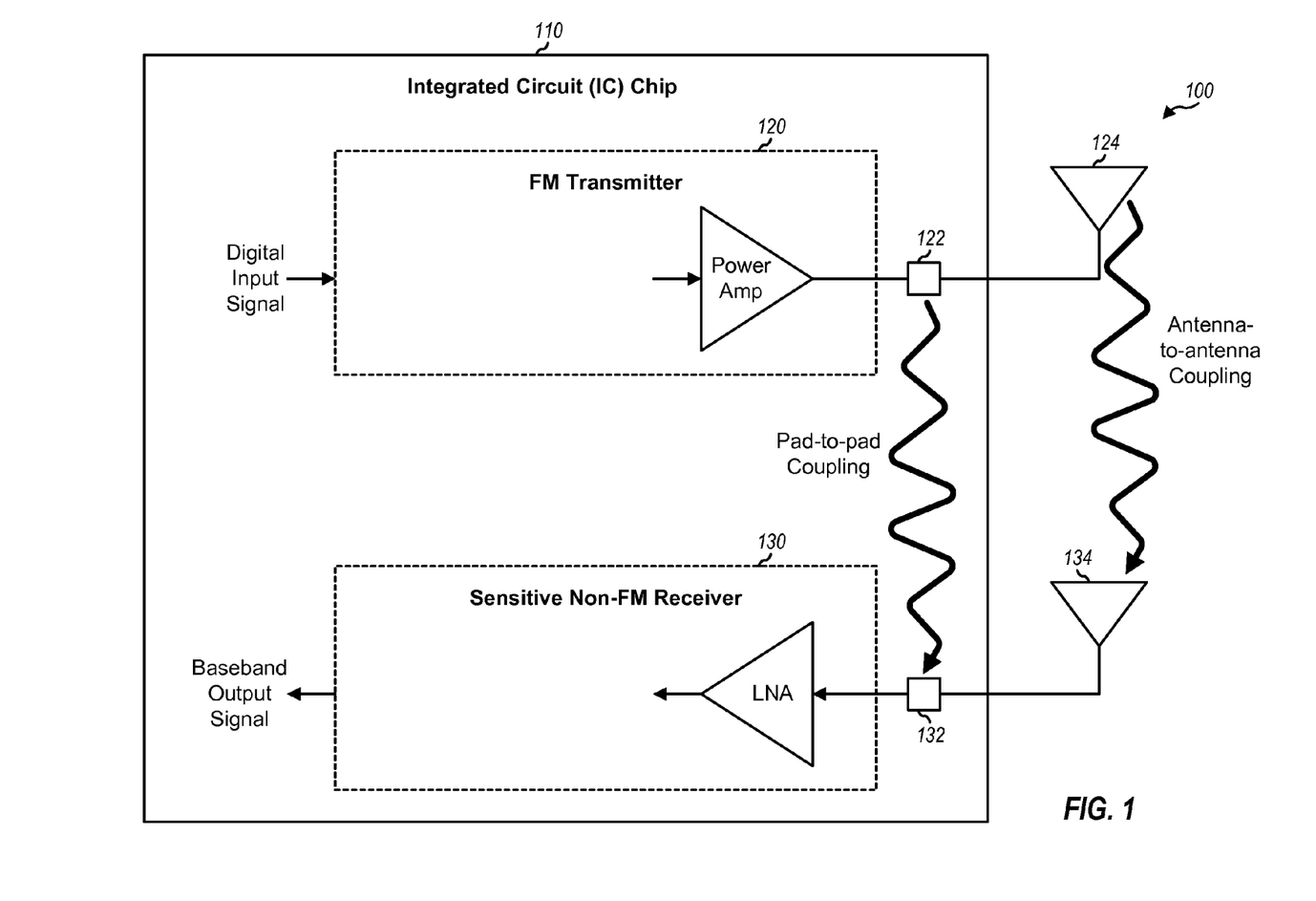
FIG. 1 shows a block diagram of a wireless device.

FIG. 1 shows a block diagram of an exemplary design of a wireless device 100. For simplicity, only an FM transmitter 120 and a non-FM receiver 130 are shown in FIG. 1. Non-FM receiver 130 may be a receiver for Code Division Multiple Access (CDMA), Global System for Mobile Communications (GSM), Global Positioning System (GPS), Medical Implant Communication System (MICS), or some other non-FM radio technology. Wireless device 100 may also include other transmitters and receivers for other radio technologies, which are not shown in FIG. 1 for simplicity. FM transmitter 120 and non-FM receiver 130 may be implemented on an integrated circuit (IC) chip 110 in order to reduce cost and size and obtain other benefits. IC chip 110 may be for an analog IC, an RF IC (RFIC), a mixed-signal IC, an application specific integrated circuit (ASIC), etc.

FM transmitter 120 receives a digital input signal (e.g., for audio output), performs FM modulation with the digital input signal, and generates an output FM signal. The output FM signal is transmitted via an antenna 124 and has undesired RF leakage from a pad 122. An antenna 134 receives RF signals from base stations and/or other transmitter stations and provides a received RF signal to non-FM receiver 130. The undesired RF leakage from pad 122 also is coupled via a pad 132 to non-FM receiver 130. Non-FM receiver 130 processes (e.g., amplifies, filters, demodulates, and digitalizes) the received RF signal and provides a baseband output signal.

The integration of FM transmitter 120 and non-FM receiver 130 on the same IC chip 110, as shown in FIG. 1, may be challenging for several reasons. First, the signal level of the output FM signal from FM transmitter 120 may be high. Although the output FM signal may be centered at a relatively low frequency between 76 to 108 mega-Hertz (MHz), harmonics of the FM signal (which are also referred to as FM harmonics) may be present at higher frequencies from hundreds of MHz to several giga-Hertz (GHz). The FM harmonics may interfere with non-FM receiver 130 when FM transmitter 120 and non-FM receiver 130 are integrated on the same IC chip and non-FM receiver 130 has high sensitivity requirements. A receiver may be considered as having high sensitivity requirements if it is required to receive a desired signal at a very low received power level, e.g., −102 dBm. The FM harmonics may couple from pad 122 to pad 132 and also from antenna 124 to antenna 134. The pad-to-pad coupling may be more severe when the two pads are on the same IC chip, and the antenna-to-antenna coupling may be less severe. In any case, the coupled FM harmonics may appear at or near a desired signal in the received RF signal and may severely hinder the ability of non-FM receiver 130 to recover the desired signal.

Figure 2:
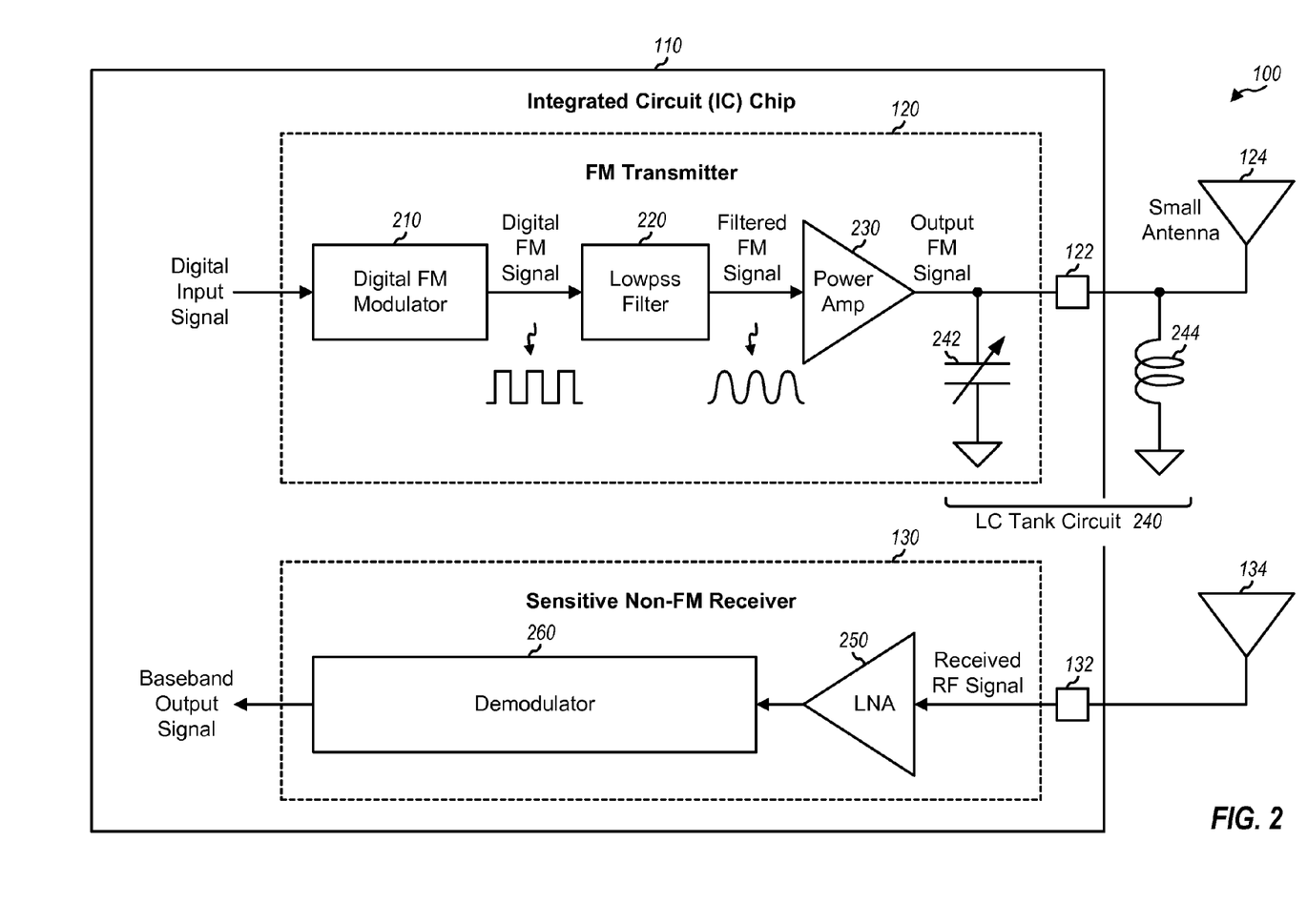
FIG. 2 shows a block diagram of an FM transmitter.

FIG. 2 shows a block diagram of an exemplary design of FM transmitter 120, which may have less coupling of FM harmonics to non-FM receiver 130. Within FM transmitter 120, a digital FM modulator 210 receives a digital input signal (e.g., for audio output), performs FM modulation with the digital input signal, and provides a digital FM signal. A lowpass filter 220 receives the digital FM signal, filters the digital FM signal to attenuate harmonics that may interfere with non-FM receiver 130, and provides a filtered FM signal. A power amplifier (Amp) 230 amplifies the filtered FM signal to obtain the desired output signal level and provides an output FM signal. Power amplifier 230 may also be referred to as a driver amplifier, an output amplifier, etc. An LC tank circuit 240 is formed by a variable capacitor 242 and an inductor 244 and operates as a bandpass filter. LC tank circuit 240 filters the output FM signal to pass a desired FM signal at a selected FM frequency and attenuate FM harmonics and noise. The output FM signal is transmitted via antenna 124.

Antenna 134 provides a received RF signal to non-FM receiver 130. Within non-FM receiver 130, a low noise amplifier (LNA) 250 amplifies the received RF signal and provides an amplified RF signal. A demodulator 260 further processes (e.g., filters, demodulates, and digitalizes) the amplified RF signal and provides the baseband output signal.

In the exemplary design shown in FIG. 2, digital FM modulator 210, lowpass filter 220, power amplifier 230, and capacitor 242 may be implemented on IC chip 110. Inductor 244 may be implemented external to IC chip 110 (as shown in FIG. 2) or on IC chip 110.

FIG. 2 shows an exemplary design of FM transmitter 120. In general, an FM transmitter may include any number of stages of filter, amplifier, etc. The circuit blocks may also be arranged differently from the configuration shown in FIG. 2.

Figure 3:
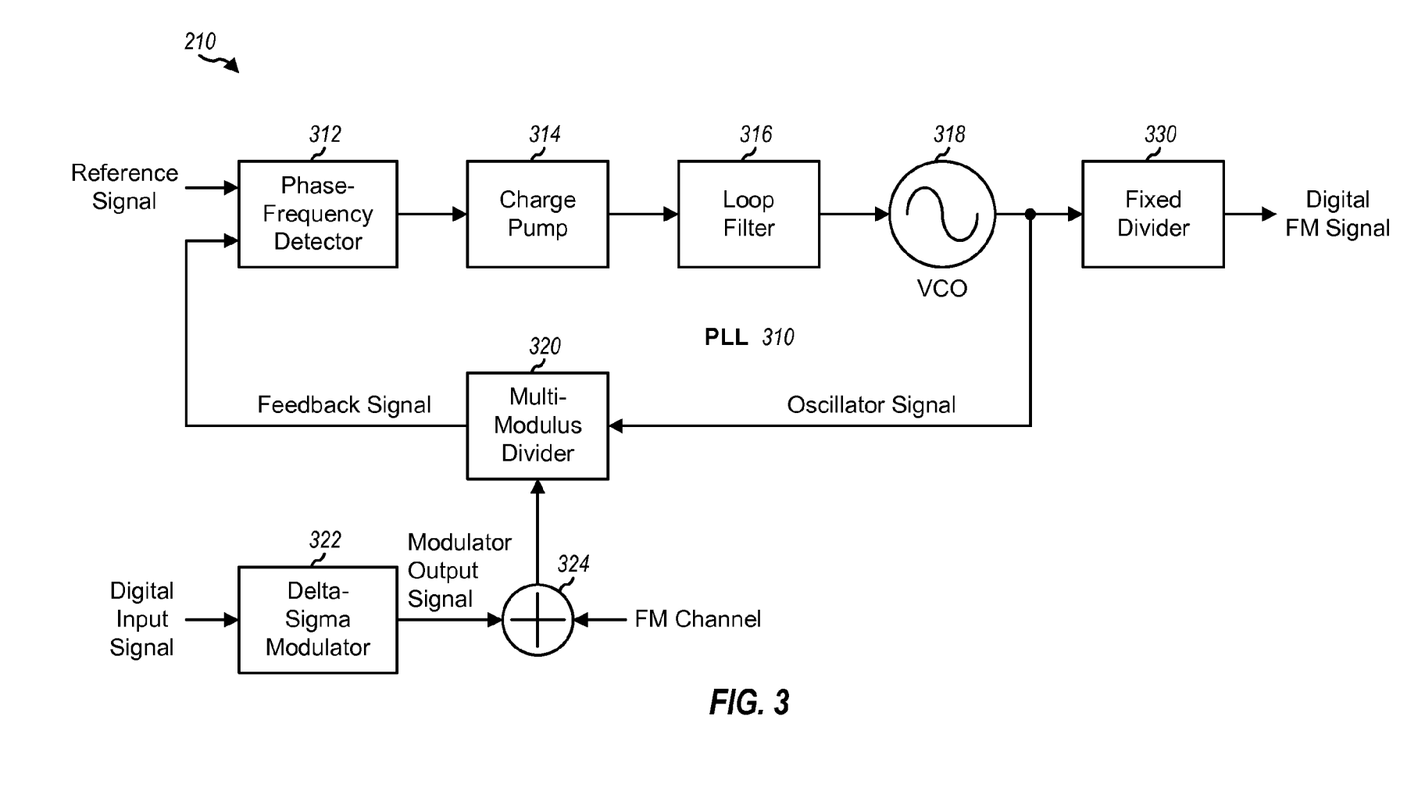
FIG. 3 shows a block diagram of a digital FM modulator.

FIG. 3 shows a block diagram of an exemplary design of digital FM modulator 210 within FM transmitter 120. Digital FM modulator 210 performs digital FM modulation using a phase-locked loop (PLL) 310. As used herein, digital FM modulation refers to frequency modulation of an oscillator signal to obtain a digital frequency modulated signal, i.e., a digital FM signal.

Within PLL 310, a phase-frequency detector 312 receives a reference signal and a feedback signal, compares the phases of the two signals, and provides a detector signal that indicates the phase difference/error between the two signals. A charge pump 314 generates an error signal that is proportional to the detected phase error. A loop filter 316 filters the error signal and provides a control voltage for a voltage controlled oscillator (VCO) 318. Loop filter 316 adjusts the control voltage such that the frequency of the feedback signal is locked to the frequency of the reference signal. VCO 318 generates an oscillator signal having a frequency that is determined by the control voltage from loop filter 316. A multi-modulus divider 320 divides the oscillator signal in frequency by a variable divider factor and provides the feedback signal. A fixed divider 330 divides the oscillator signal by a fixed divider ratio (e.g., 2, 4, etc.) and provides the digital FM signal.

A delta-sigma ($\Delta\Sigma$) modulator 322 receives the digital input signal having multiple bits (e.g., 16 or more bits) of resolution at a relatively low input rate and generates a modulator output signal having the same resolution but using one or few bits at a high output rate. A summer 324 sums the modulator output signal with an offset value corresponding to a selected FM channel and provides the variable divider factor for multi-modulus divider 320.

Although not shown in FIG. 3, a predistortion unit may be inserted prior to $\Delta\Sigma$ modulator 322 and may perform predistortion on the digital input signal for gain and phase mismatches in PLL 310. The predistortion unit may perform digital gain and/or phase equalization to mitigate the effects of the PLL closed-loop bandwidth on the FM modulation. $\Delta\Sigma$ modulator 322 may then receive a predistorted input signal instead of the digital input signal.

PLL 310 locks the frequency of the feedback signal to the frequency of the reference signal. Thus, changing the divider ratio of divider 320 will cause a change in the frequency of the oscillator signal from VCO 318. Digital FM modulation is accomplished by controlling the divider ratio of divider 320 in such a way that the frequency of the oscillator signal is modulated by the instantaneous deviations of the digital input signal.

FIG. 3 shows an exemplary design of digital FM modulator 210, which may also be implemented in other manners. In another exemplary design, digital FM modulator 210 may perform direct FM VCO modulation. This may be achieved by applying the output of summer 324 at the input of loop filter 316. In yet another exemplary design, digital FM modulator 210 may perform digital I/Q modulation. This may be achieved by (i) integrating the digital input signal, (ii) taking the cosine and sine of the integrated signal, and (iii) upconverting the cosine and sine components to a carrier frequency using a single sideband (SSB) modulator. In yet another exemplary design, digital FM modulator 210 may perform 2-point modulation. This may be achieved by (i) modulating the variable divide ratio of divider 320 or the reference signal via a lowpass modulation path and (ii) modulating VCO 318 via a highpass modulation path. Digital FM modulation may also be performed in other manners.

Figure 4:
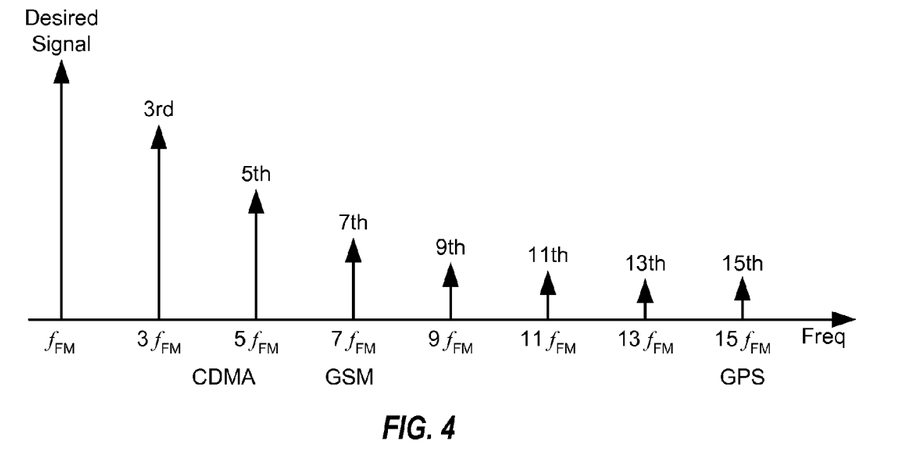
FIG. 4 shows a spectral plot of a digital FM signal.

FIG. 4 shows a spectral plot of the digital FM signal from digital FM modulator 210. The digital FM signal resembles a digital clock signal at a selected FM frequency of $f_{FM}$ and contains narrowband FM modulation. The FM frequency $f_{FM}$ is within a range of 76 to 108 MHz and may be selected by a user. Due to its clock-like waveform, the digital FM signal contains a strong desired signal component at the selected FM frequency as well as odd FM harmonics at frequencies of $3f_{FM}$, $5f_{FM}$, $7f_{FM}$, etc. Some of the FM harmonics may fall within frequency bands used by CDMA systems, GSM systems, GPS, etc. For example, the 15-th FM harmonics may fall near 1575.42 MHz used for GPS and may degrade the performance of a GPS receiver, which may have high sensitivity requirements and may be more susceptible to interference. It is desirable to attenuate the FM harmonics in the digital FM signal, especially those that may fall within the frequency band covered by non-FM receiver 130.

Figure 5A:
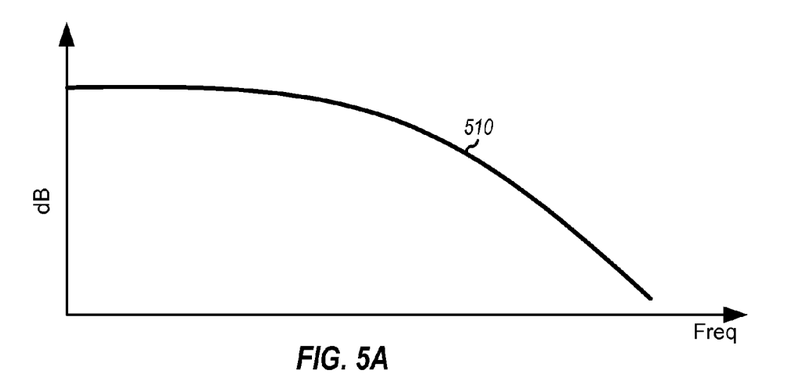
FIG. 5A shows a frequency response of a lowpass filter.

FIG. 5A shows a frequency response 510 of an exemplary design of lowpass filter 220 within FM transmitter 120. In this exemplary design, frequency response 510 has a relatively flat passband covering the FM frequency range and gradually rolls off at a rate determined by the order of lowpass filter 220. More attenuation may be obtained with a higher-order lowpass filter. Frequency response 510 may be used to provide more attenuation of FM harmonics at high frequency.

Figure 5B:
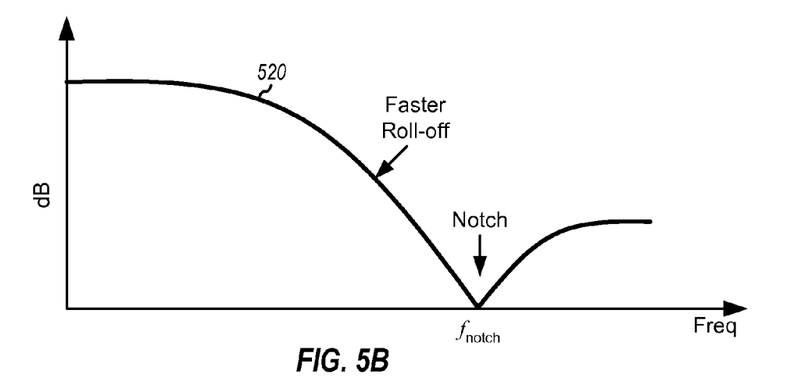
FIG. 5B shows a frequency response of another lowpass filter.

FIG. 5B shows a frequency response 520 of another exemplary design of lowpass filter 220. In this exemplary design, frequency response 520 has a notch at a frequency of $f_{notch}$ and rolls off more sharply from the 3 dB bandwidth frequency. The notch may be used to provide greater attenuation of one or more FM harmonics at the expense of less attenuation of higher FM harmonics. The notch may also be placed at a specific frequency (e.g., GPS frequency) to obtain high attenuation of the FM harmonic at this frequency.

FIGS. 5A and 5B show frequency responses of two exemplary designs of lowpass filter 220. Other frequency responses may also be obtained with other lowpass filter designs. In general, a suitable frequency response may be selected based on various factors such as the desired performance of FM transmitter 120, the requirements of non-FM receiver 130, etc. For example, frequency response 510 in FIG. 5A may be used if non-FM receiver 130 is a GPS receiver and greater attenuation of the 15-th FM harmonic is desired. Frequency response 520 in FIG. 5B may be used if non-FM receiver 130 is a CDMA or GSM receiver operating in a low frequency band and greater attenuation of low FM harmonics is desired.

Figure 6:
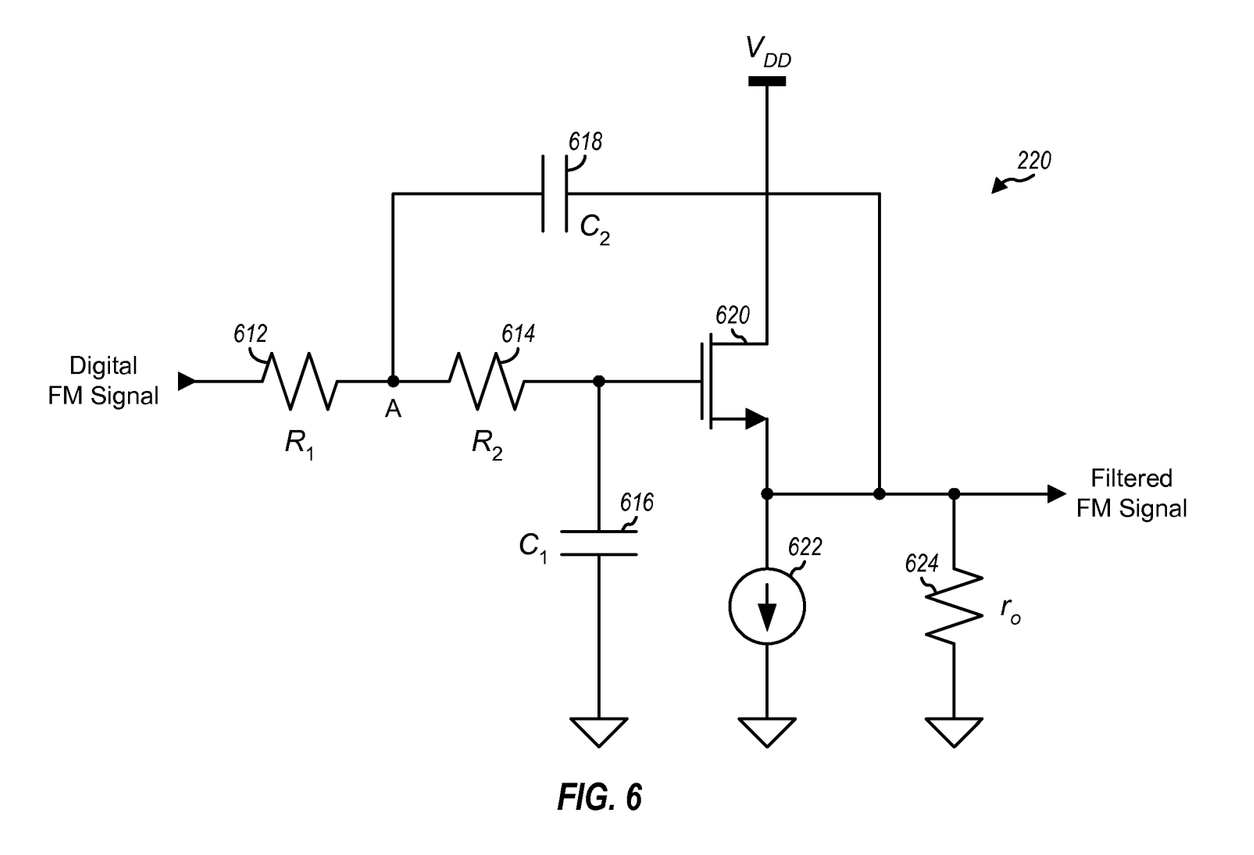
FIG. 6 shows a schematic diagram of a Sallen-Key lowpass filter.

FIG. 6 shows a schematic diagram of an exemplary design of lowpass filter 220, which is implemented with a second-order Sallen-Key lowpass filter. Within lowpass filter 220, a resistor 612 with a value of $R_1$ has one end receiving the digital FM signal and the other end coupled to node A. A resistor 614 with a value of $R_2$ is coupled between node A and the gate of an N-channel metal oxide semiconductor (NMOS) transistor 620. A capacitor 616 with a value of $C_1$ is coupled between the gate of NMOS transistor 620 and circuit ground. A capacitor 618 with a value of $C_2$ is coupled between node A and the source of NMOS transistor 620. NMOS transistor 620 is coupled as a source follower and has its drain coupled to a power supply voltage, $V_{DD}$, and its source providing the filtered FM signal. A current source 622 is coupled between the source of NMOS transistor 620 and circuit ground and provides a bias current for NMOS transistor 620. NMOS transistor 620 has a finite output impedance of $r_o$, which is modeled by a resistor 624 coupled between the source of NMOS transistor 620 and circuit ground.

The transfer function H(s) of a second-order Sallen-Key lowpass filter with an amplifier having a finite output impedance, as shown in FIG. 6, may be expressed as:

$$H(s) = \frac{s^2 r_o R_2 C_1 C_2 + s r_o C_2 + K}{s^2 [R_1 R_2 C_1 C_2 + r_o (R_1 + R_2) C_1 C_2] + s[(R_1 + R_2) C_1 + (r_o + (1-K) R_1) C_2] + 1}, \quad \text{Eq (1)}$$

where $$\omega_c = \frac{1}{\sqrt{R_1 R_2 C_1 C_2 + r_0 (R_1 + R_2) C_1 C_2}}$$

is the cutoff frequency of the lowpass filter, $$Q = \frac{\sqrt{R_1 R_2 C_1 C_2 + r_0 (R_1 + R_2) C_1 C_2}}{(R_1 + R_2) C_1 + [r_0 + (1-K) R_1] C_2}$$

is the quality factor, and

K is the gain of the amplifier, which may be one or less.

The Q factor determines the height and width of a peak (if any) in the frequency response of the lowpass filter. A higher peak may be obtained with a higher Q. A maximally flat passband response for a Butterworth filter may be obtained with a Q of $1/\sqrt{2}$. The desired frequency response may be obtained by selecting appropriate values of $R_1$ and $R_2$ for resistors 612 and 614 and appropriate values of $C_1$ and $C_2$ for capacitors 616 and 618.

The transfer function of a Sallen-Key lowpass filter with an ideal unity-gain amplifier (with $r_0$=0) has no zeros. However, as shown in equation (1), the finite output impedance $r_o$ of a non-ideal amplifier results in zeros in the transfer function H(s). The Sallen-Key lowpass filter may then have the frequency response shown in FIG. 5B. The notch frequency may be determined by the output impedance $r_o$, the resistor value $R_2$, and the capacitor values $C_1$ and $C_2$. The output impedance $r_o$ may be approximated as $r_0 = 1/g_m$, where $g_m$ is the transconductance of NMOS transistor 620.

FIG. 6 shows an exemplary design of a second-order Sallen-Key lowpass filter using an NMOS transistor. In general, an amplifier for a Sallen-Key filter may be implemented with any type of transistor or amplifier, e.g., P-channel metal oxide semiconductor (PMOS) transistors, bipolar junction transistors (BJTs), an operational amplifier (Op-Amp), an operational transconductance amplifier (OTA), etc.

FIG. 6 shows an exemplary design of lowpass filter 220. In general, lowpass filter 220 may be implemented as a passive lowpass filter (e.g., using only resistors, capacitors, and/or inductors) or as an active lowpass filter (e.g., using resistors, capacitors, transistors, amplifiers, etc.). Lowpass filter 220 may be implemented with any order, any filter type, and any filter architecture. For example, lowpass filter 220 may be implemented with a second, fourth, or higher order filter. Lowpass filter 220 may be implemented with a Butterworth filter, a Bessel filter, an elliptical filter, a Chebychev filter, etc. Elliptical and Chebychev filters have notches whereas Butterworth and Bessel filters do not. Lowpass filter 220 may also be implemented with a cascade of RC or active lowpass filter stages.

Referring back to FIG. 2, LC tank 240 may provide additional filtering for the output FM signal. LC tank 240 has a bandpass response with a center frequency of $\omega_0$, which may be expressed as:

$$\omega_0 = \frac{1}{\sqrt{LC}}, \quad \text{Eq (2)}$$

where C is the capacitance of capacitor 242 and L is the inductance of inductor 244.

Capacitor 242 may have a tunable value that may be determined based on the selected FM frequency. In one exemplary design, capacitor 242 may be implemented with a bank of unit capacitors having equal capacitance. In another exemplary design, capacitor 242 may be implemented with a bank of capacitors having progressively larger capacitance, e.g., with each capacitor being twice the size of the previous capacitor. For both exemplary designs, an appropriate set of capacitors in the bank may be selected to obtain the proper capacitance for the selected FM frequency.

In the exemplary design shown in FIG. 2, capacitor 242 is implemented on IC chip 110 and inductor 244 is implemented external to the IC chip. In another exemplary design, capacitor 242 and inductor 244 may both be implemented on IC chip 110 or external to the IC chip.

Power amplifier 230 may be implemented in various manners. Power amplifier 230 may be designed with good linearity, so that additional FM harmonics are not generated by the amplifier. Power amplifier 230 may also be implemented with multiple stages coupled in series or parallel. A sufficient number of stages may be enabled to provide the desired output signal level, and remaining stages may be disabled to save power.

Antenna 124 used to transmit the output FM signal may be implemented with a dipole antenna, a patch antenna, a microstrip antenna, a stripline antenna, a printed dipole antenna, an inverted F antenna, a loop antenna, a monopole antenna, etc. Antenna 124 may be a small antenna. An antenna may be considered as "small" if its dimension is much less than a quarter wavelength. For example, at the highest FM frequency of 108 MHz, a quarter wavelength is equal to 0.7 meters, and antenna 124 will likely be much smaller than 0.7 meters due to the small size of portable wireless devices.

Antenna 124 may have a larger loss at FM frequency due to its small size. Antenna 124 may be driven with a larger output FM signal to compensate for the larger antenna loss. The larger output FM signal may also result in more pad-to-pad coupling, which may be combated with lowpass filter 220 and LC tank circuit 240.

LC tank circuit 240 may provide good performance for small antenna 124. LC tank circuit 240 may provide better performance than a matching network (which is circuitry that minimizes reflection), an impedance matching network with multiple stages or a quarter wavelength impedance transformer, etc.

The FM transmitter described herein may provide certain advantages. First, all or most of the FM transmitter may be implemented on an IC chip, which may reduce cost, area, and power consumption. The FM transmitter may also be integrated with a non-FM receiver (e.g., a GSM receiver, a CDMA receiver, a GPS receiver, a MICS receiver, etc.), which may have high sensitivity requirements. The filtering of the FM signal prior to and after the power amplifier may attenuate FM harmonics by a sufficient amount, so that the FM harmonics may minimally degrade the performance of the sensitive non-FM receiver. Demand for an FM transmitter integrated in portable wireless devices may be large and may be addressed with the FM transmitter described herein.

In one exemplary design, an integrated circuit may comprise an FM transmitter and a non-FM receiver. The FM transmitter may receive a digital input signal, perform FM modulation with the digital input signal, and provide an output FM signal. The non-FM receiver may receive an RF signal, perform demodulation for the received RF signal, and provide a baseband output signal. The non-FM receiver may comprise a CDMA receiver, a GSM receiver, a GPS receiver, a MICS receiver, etc.

In another exemplary design, an apparatus may comprise a digital FM modulator and a lowpass filter. The digital FM modulator may receive a digital input signal, perform FM modulation with the digital input signal, and provide a digital FM signal. The lowpass filter may filter the digital FM signal and provide a filtered FM signal.

In one exemplary design, the digital FM modulator may comprise a PLL and a delta-sigma modulator. The PLL may comprise a multi-modulus divider that divides an oscillator signal in frequency by a variable divider ratio. The delta-sigma modulator may receive the digital input signal and generate a modulator output signal used to obtain the variable divider ratio. The digital FM modulator may also be implemented in other manners.

In one exemplary design, the lowpass filter may comprise a Sallen-Key lowpass filter, which may be implemented as shown in FIG. 6. The Sallen-Key lowpass filter may have a notch formed by a finite output impedance of an amplifier, which may have a gain close to one. The digital FM signal may comprise a desired signal component at a selected FM frequency and odd harmonics. The lowpass filter may pass the desired signal component at the selected FM frequency and may attenuate harmonics at higher frequency, e.g., harmonics falling within a frequency band of the non-FM receiver. The lowpass filter can provide greater attenuation at the notch frequency.

The apparatus may further comprise an amplifier and an LC tank circuit. The amplifier may amplify the filtered FM signal and provide an output FM signal. The LC tank circuit may filter the output FM signal with a bandpass response. The LC tank circuit may comprise a variable capacitor and an inductor coupled in parallel. The variable capacitor may be adjusted based on the selected FM frequency. The digital FM modulator and the variable capacitor may be implemented on an IC chip, and the inductor being implemented external to the IC chip, e.g., as shown in FIG. 2.

The apparatus may comprise a small antenna to transmit the output FM signal. The small antenna may have a size smaller than a quarter wavelength of the highest FM frequency.

Figure 7:
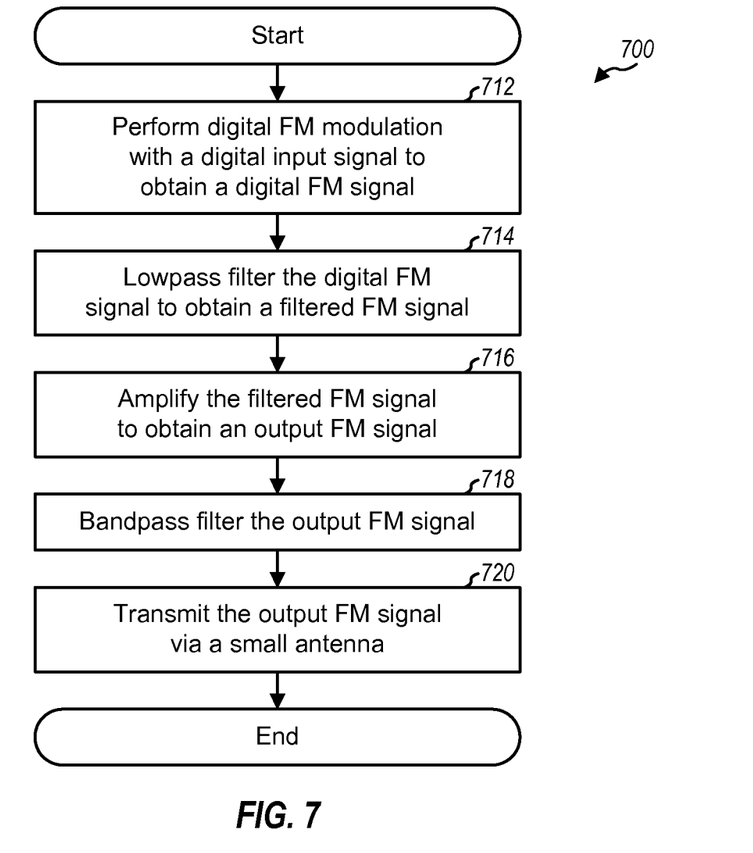
FIG. 7 shows a process for performing FM modulation.

FIG. 7 shows an exemplary design of a process 700 for performing FM modulation. Digital FM modulation may be performed with a digital input signal to obtain a digital FM signal (block 712). In one exemplary design of block 712, an oscillator signal may be divided in frequency by a variable divider ratio. Delta-sigma modulation may be performed on the digital input signal to obtain the variable divider ratio. The digital FM signal may be lowpass filtered, e.g., with a lowpass filter having a notch, to obtain a filtered FM signal (block 714). The filtered FM signal may be amplified to obtain an output FM signal (block 716). The output FM signal may be bandpass filtered, e.g., with an LC tank circuit (block 718). The output FM signal may be transmitted via a small antenna (block 720)

All or most of the FM transmitter described herein may be implemented on an IC, an analog IC, an RFIC, a mixed-signal IC, an ASIC, etc. The FM transmitter may also be fabricated with various IC process technologies such as complementary metal oxide semiconductor (CMOS), NMOS, PMOS, BJT, bipolar-CMOS (BiCMOS), silicon germanium (SiGe), gallium arsenide (GaAs), indium phosphide (InP), etc.

An apparatus implementing the FM transmitter described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An integrated circuit comprising:
a frequency modulation (FM) transmitter to receive a digital input signal, perform FM modulation with the digital input signal, and provide an output FM signal, the output FM signal adjustably bandpass filtered based on a selected FM frequency; and
a non-FM receiver to receive a radio frequency (RF) signal, perform demodulation for the received RF signal, and provide a baseband output signal.

2. The integrated circuit of claim 1, the FM transmitter comprising
a digital FM modulator to perform FM modulation with the digital input signal and provide a digital FM signal, and
a lowpass filter to filter the digital FM signal and provide a filtered FM signal.

3. The integrated circuit of claim 2, the digital FM modulator comprising
a phase-locked loop (PLL) comprising a multi-modulus divider to divide an oscillator signal in frequency by a variable divider ratio, and a delta-sigma modulator to receive the digital input signal and generate a modulator output signal used to obtain the variable divider ratio.

4. The integrated circuit of claim 2, the lowpass filter comprising a Sallen-Key lowpass filter.

5. The integrated circuit of claim 2, the lowpass filter passing a desired signal component at a selected FM frequency and attenuating harmonics of the digital FM signal falling within a frequency band of the non-FM receiver.

6. The integrated circuit of claim 1, the non-FM receiver comprising a Code Division Multiple Access (CDMA) receiver, a Global System for Mobile Communications (GSM) receiver, or a Global Positioning System (GPS) receiver.

7. An apparatus comprising:
a digital frequency modulation (FM) modulator to receive a digital input signal, perform FM modulation with the digital input signal, and provide a digital FM signal;
a lowpass filter to filter the digital FM signal and provide a filtered FM signal; and
an amplifier to amplify the filtered FM signal and provide an output FM signal, the output FM signal adjustably bandpass filtered based on a selected FM frequency.

8. The apparatus of claim 7, the digital FM modulator comprising
a phase-locked loop (PLL) comprising a multi-modulus divider to divide an oscillator signal in frequency by a variable divider ratio, and
a delta-sigma modulator to receive the digital input signal and generate a modulator output signal used to obtain the variable divider ratio.

9. The apparatus of claim 7, the lowpass filter comprising a Sallen-Key lowpass filter.

10. The apparatus of claim 9, the Sallen-Key lowpass filter comprising
a metal oxide semiconductor (MOS) transistor having a gate and a source, the source providing the filtered FM signal,
first and second resistors coupled in series and to the gate of the MOS transistor,
a first capacitor coupled between the gate of the MOS transistor and circuit ground, and
a second capacitor coupled to the source of the MOS transistor and the first and second resistors.

11. The apparatus of claim 10, the Sallen-Key lowpass filter having a notch formed by a finite output impedance of the MOS transistor.

12. The apparatus of claim 7, the lowpass filter having at least one notch and providing greater attenuation at each notch frequency.

13. The apparatus of claim 7, further comprising:
an LC tank circuit to filter the output FM signal with a bandpass response.

14. The apparatus of claim 7, the digital FM signal comprising a desired signal component at a selected FM frequency and odd harmonics, and the lowpass filter attenuating the odd harmonics at higher frequency.

15. An apparatus comprising:
a digital frequency modulation (FM) modulator to receive a digital input signal, perform FM modulation with the digital input signal, and provide a digital FM signal; and
an LC tank circuit to perform filtering for the digital FM signal and provide an output FM signal, the output FM signal adjustably bandpass filtered based on a selected FM frequency.

16. The apparatus of claim 15, the LC tank circuit comprising
a variable capacitor and an inductor coupled in parallel, the variable capacitor being adjusted based on the selected FM frequency.

17. The apparatus of claim 16, the digital FM modulator and the variable capacitor being implemented on an integrated circuit (IC) chip, and the inductor being implemented external to the IC chip.

18. A wireless device comprising:
a digital frequency modulation (FM) modulator to receive a digital input signal, perform FM modulation with the digital input signal, and provide a digital FM signal; and
a small antenna to transmit an output FM signal generated based on the digital FM signal, the output FM signal adjustably bandpass filtered based on a selected FM frequency, the small antenna having a size smaller than a quarter wavelength of a highest FM frequency.

19. A method of performing frequency modulation (FM), comprising:
performing digital FM modulation with a digital input signal to obtain a digital FM signal;
lowpass filtering the digital FM signal to obtain a filtered FM signal; and
amplifying the filtered FM signal to obtain an output FM signal, the output FM signal adjustably bandpass filtered based on a selected FM frequency.

20. The method of claim 19, further comprising:
bandpass filtering the output FM signal.

21. The method of claim 19, the performing digital FM modulation comprising
dividing an oscillator signal in frequency by a variable divider ratio, and
performing delta-sigma modulation on the digital input signal to obtain the variable divider ratio.

22. The method of claim 19, the lowpass filtering comprising lowpass filtering the digital FM signal with a lowpass filter having a notch.

23. An apparatus for performing frequency modulation (FM), comprising:
means for performing digital FM modulation with a digital input signal to obtain a digital FM signal;
means for lowpass filtering the digital FM signal to obtain a filtered FM signal; and
means for amplifying the filtered FM signal to obtain an output FM signal, the output FM signal adjustably bandpass filtered based on a selected FM frequency.

24. The apparatus of claim 23, further comprising:
means for bandpass filtering the output FM signal.

25. The apparatus of claim 23, the means for performing digital FM modulation comprising
means for dividing an oscillator signal in frequency by a variable divider ratio, and
means for performing delta-sigma modulation on the digital input signal to obtain the variable divider ratio.

* * * * *